Nov. 30, 1926.
W. H. DEAN, JR
1,608,549
STEERING WHEEL SWITCH DIMMER
Filed Jan. 28, 1925
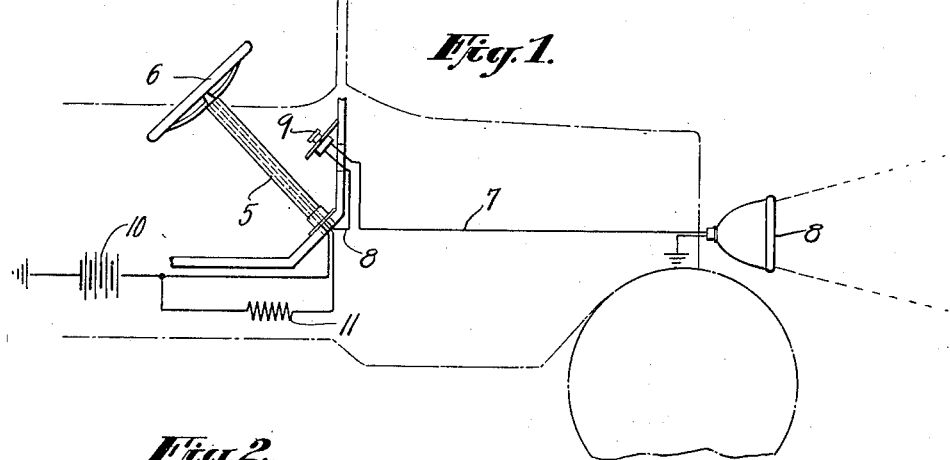
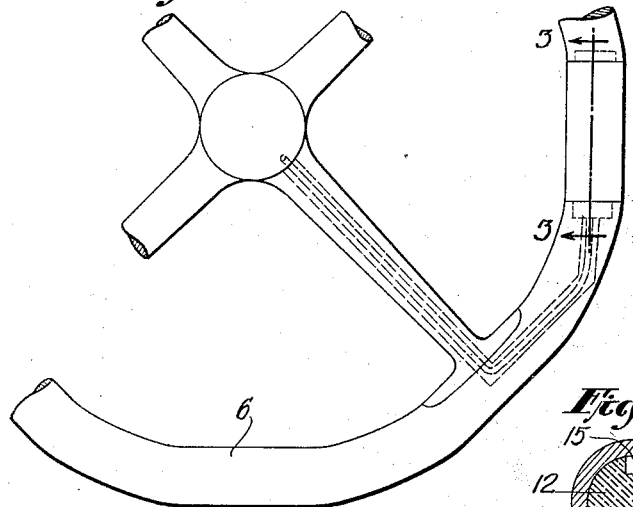
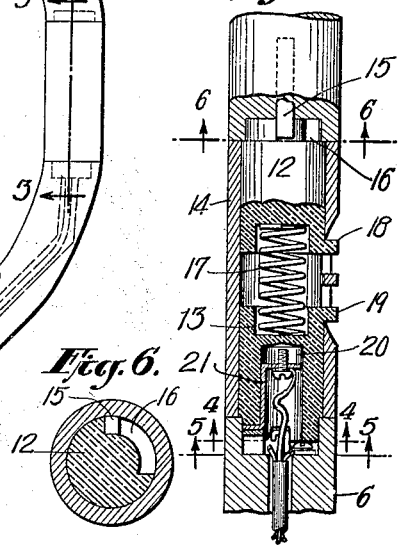
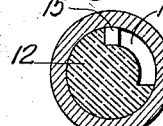
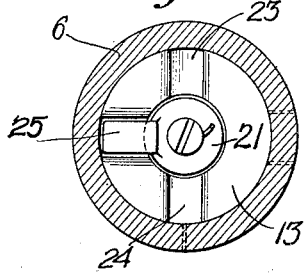
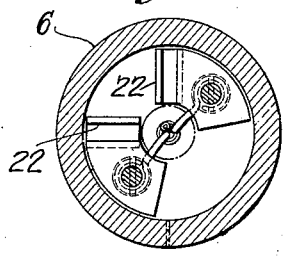
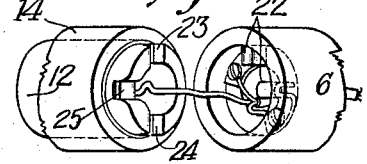
INVENTOR.
W. H. DEAN, JR
BY
*Richard B. Owen*
ATTORNEY.

Patented Nov. 30, 1926.

1,608,549

UNITED STATES PATENT OFFICE.

WILLIAM H. DEAN, JR., OF NEW YORK, N. Y.

STEERING-WHEEL SWITCH DIMMER.

Application filed January 28, 1925. Serial No. 5,382.

This invention relates to switching devices for dimming the headlights of motor vehicles and more particularly to a novel and improved construction positioned on the steering wheel of the vehicle, whereby the lights may be dimmed by the driver without removing his hands from the steering wheel.

One of the objects of my invention is to provide a novel and improved switching means on the steering wheel of a motor vehicle, constructed and arranged whereby the operator may dim the headlights by a slight twist of the hand without removing the hands from the steering wheel.

A further object of my invention is to provide a headlight switch of the character above set forth which may be built in or located on the rim of a steering wheel and operated by a slight rotating action as opposed to a sliding operation so that the headlights may be dimmed by the operator without removing his hands from the steering wheel.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a view showing the steering wheel and a circuit to the headlight.

Figure 2 is a fragmentary view showing a portion of the steering wheel and the switch mechanism located therein.

Figure 3 is a view, partly in section, taken on the line 3—3 of Figure 2.

Figure 4 is a sectional view taken on the line 4—4 of Figure 3.

Figure 5 is a sectional view taken on the line 5—5 of Figure 3.

Figure 6 is a sectional view taken on the line 6—6 of Figure 3.

Figure 7 is an end view, showing the contacts between the movable sections and the rim of the wheel proper.

Referring now to the drawings, wherein like reference characters designate corresponding parts throughout the several views, 5 designates the steering post and 6 the rim of the steering wheel of a motor vehicle through which electrical conductors 7, 8, lead to the headlight and to a conventional type of switch designated by numeral 9, and positioned preferably on the dash board. The two leads or conductors are connected with a battery 10, one of said leads having a resistance coil 11 in the circuit whereby the headlights may be dimmed when the proper contacts are made in the manner now to be described.

The rim of the wheel 6 is partially cut away at one point to receive a removable section consisting of an insulated, cylindrical block 12 and a complementary, opposed, insulated block 13, said blocks being connected together by a recessed sleeve 14, and rotatable therewith, the diameter of said sleeve being substantially the same as the diameter of the main portion of the rim. Extending within the block 12, is a pin 15, which is adapted to operate in a segmental slot 16 formed in the end of the block 12, thus permitting the rotation of the sleeve a quarter turn. The inner ends of the block 12 and the block 13 are provided with recesses to receive the ends of a coil spring 17, whereby said blocks may be spaced apart. Side lugs or extensions 18, 19, are provided on the respective blocks whereby they may be seized and moved toward each other against the resistance of the spring when it is desired to remove the pin from the slot 16 and separate the recessed sleeve from the rim proper, as when it is desired to make repairs or gain access to the connections or contacts and the conductors.

The block 13 above referred to, is formed with a central groove 20, in which is positioned an angular contact plate 21, the said contact plate 21 is provided with two contact faces 22, which are curved or rounded so as to ride freely into and out of the notches 23, 24 in the adjacent portion of the rim. At this location on the rim, a contact plate 25 is positioned, it being of course understood, that the leads 7, 8, are connected to the respective contact plates above referred to. In one position of the contacts 22, 25, the surface leading to the headlights permits the full power and maximum light to be given, on the other hand, when the split sleeve and the block carried thereby are rotated a quarter turn, the opposed contact 22 will ride out of the notch 23, for instance, and in turn make contact with the contact plate 25, in which instance, the resistance coil 11 is included in the circuit and consequently less power and less light are given to the headlights. It will be recognized that but a slight rotation or twisting movement of the hand is sufficient to bring the respective contacts into engagement to dim the lights or to turn on the full power and that the operator does not have to move his hands from the steering wheel, no matter in what position the wheel may be, as when turning a corner or when making short turns when driving a motor vehicle.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A vehicle steering wheel having a removable rotatable section comprising a split clamping sleeve and a pair of insulated blocks therein, a retaining pin received within one of said blocks, said block being yieldably held in engagement with the retaining pin, the opposite block having a pair of contacts, and a stationary contact on the wheel cooperating with the first mentioned contacts.

2. A vehicle steering wheel having a removable rotatable section comprising a split clamping sleeve and a pair of insulated blocks therein, a retaining pin, means positioned between the said insulated blocks for yieldably retaining one of them in engagement with the pin, the opposite block having a pair of contacts, and a stationary contact on the wheel adjacent the first named contacts and engageable thereby upon rotation of the said rotatable section.

3. A vehicle steering wheel having a removable rotatable section comprising a split clamping sleeve, a pair of insulated blocks, a pin for retaining one of said blocks in position and adapted to limit the rotation of the removable section, a pair of contacts carried by the removable section, and a stationary contact on the wheel, engageable by the first-mentioned contacts upon rotation of the said rotatable section.

4. A vehicle steering wheel having a removable section comprising a split sleeve, a pair of complementary insulated blocks, a spring interposed between the said blocks, a retaining pin for one of the blocks, said pin being adapted to limit the movement of rotation of the removable section relative to the body of the wheel, means for releasing said pin, contacts on the end of the opposite block, and a stationary contact cooperating with the first mentioned contacts.

5. A vehicle steering wheel having a removable, rotatable section comprising a split clamping sleeve and a pair of insulated blocks therein, and a segmental slot in the end of one of the blocks, a retaining pin for said blocks operable within the slot, the opposite block having two contacts, means for urging one of the blocks toward the other for releasing the said retaining pin, a stationary contact and grooves on the wheel adjacent the two contacts.

In testimony whereof I affix my signature.

WILLIAM H. DEAN, Jr. [L. S.]